(12) United States Patent
Martin

(10) Patent No.: US 10,685,544 B2
(45) Date of Patent: Jun. 16, 2020

(54) REMOTELY-CONTROLLED MAGNETIC SURVEILLANCE AND ATTACK PREVENTION SYSTEM AND METHOD

(71) Applicant: Geoffrey Martin, Overland Park, KS (US)

(72) Inventor: Geoffrey Martin, Overland Park, KS (US)

( * ) Notice: Subject to any disclaimer, the term of this patent is extended or adjusted under 35 U.S.C. 154(b) by 0 days.

(21) Appl. No.: 16/557,826

(22) Filed: Aug. 30, 2019

(65) Prior Publication Data

US 2020/0074825 A1 Mar. 5, 2020

Related U.S. Application Data

(60) Provisional application No. 62/725,121, filed on Aug. 30, 2018.

(51) Int. Cl.
*G08B 15/02* (2006.01)
*G08B 13/24* (2006.01)
(Continued)

(52) U.S. Cl.
CPC .............. *G08B 13/24* (2013.01); *G05B 15/02* (2013.01); *G08B 15/005* (2013.01); *G08B 15/02* (2013.01); *G08B 25/12* (2013.01)

(58) Field of Classification Search
CPC ...... G08B 13/14; G08B 15/02; G08B 15/005; G08B 25/12; G08B 13/19623; G08B 13/19632; G08B 13/19636; G08B 13/19697; G08B 13/19691; G08B 13/24; G08B 13/19619
(Continued)

(56) References Cited

U.S. PATENT DOCUMENTS

| 4,112,818 A | 9/1978 | Garehime, Jr. |
| 4,398,184 A * | 8/1983 | Scott ............ G08B 13/10 340/531 |

(Continued)

FOREIGN PATENT DOCUMENTS

GB 2470830 12/2010

OTHER PUBLICATIONS

"International Search Report and Written Opinion".

*Primary Examiner* — Hung T Nguyen
(74) *Attorney, Agent, or Firm* — Law Office of Mark Brown, LLC; Ryan S. Hinderliter

(57) ABSTRACT

A remotely-controlled, movable, magnetic system and method for surveillance and attack prevention. The system includes a motive apparatus including a mounting body for mounting a series of magnets and wheels or rollers and suspending the apparatus from a magnetic ceiling T-bar grid or alternative metal track. The wheels or rollers make contact with the T-bars or track; provide some space between the magnets and T-bars or track; and allow for movement of the system along the T-bar grid or track. One or more of the wheels is drivingly connected to a drive motor. The system further includes a processor, an input/output interface, and a remote computing device or remote control for controlling the motive apparatus via a communications network. The motive apparatus further mounts components and tools remotely controlled by a user for observing, identifying a potential attacker, and hindering a potential attack.

20 Claims, 16 Drawing Sheets

(51) Int. Cl.
*G05B 15/02* (2006.01)
*G08B 15/00* (2006.01)
*G08B 25/12* (2006.01)

(58) Field of Classification Search
USPC .... 340/506, 539.11, 541, 551; 348/143, 152
See application file for complete search history.

(56) References Cited

U.S. PATENT DOCUMENTS

| | | | |
|---|---|---|---|
| 5,049,218 A | 9/1991 | Martin | |
| 6,886,651 B1* | 5/2005 | Slocum | B60L 13/04 |
| | | | 104/281 |
| 7,956,735 B2* | 6/2011 | Jackson | G08B 13/19656 |
| | | | 340/506 |
| 2007/0256105 A1* | 11/2007 | Tabe | G08B 13/19697 |
| | | | 725/78 |
| 2010/0128123 A1* | 5/2010 | DiPoala | G08B 13/19619 |
| | | | 348/143 |
| 2011/0285851 A1* | 11/2011 | Plocher | G08B 13/19608 |
| | | | 348/152 |

* cited by examiner

REMOTELY-CONTROLLED MAGNETIC SURVEILLANCE AND ATTACK PREVENTION SYSTEM AND METHOD

CROSS-REFERENCE TO RELATED APPLICATION

This application claims priority in U.S. Provisional Patent Application No. 62/725,121, filed Aug. 30, 2018, which is incorporated herein by reference.

BACKGROUND OF THE INVENTION

1. Field of the Invention

The present invention relates generally to remotely-controlled, suspended devices and more specifically to remotely-controlled, magnetic, suspended systems and methods for intruder attack prevention and suppression.

2. Description of the Related Art

Unfortunately, in recent years, violent attacks on civilians have increased in frequency to the point where they have practically become commonplace. Such attackers have used firearms, explosives, and other types of weaponry to carry out these violent attacks, creating horrific scenes which have resulted in many tragic deaths and serious injuries to innocent civilians in schools, in churches, at concerts, at bars, in movie theaters, and at various other public places. Finding solutions to maximize the safety of individuals in these types of situations is of the utmost importance to society so that these tragedies can be avoided or lessened.

Periodic safety and evacuation drills can provide people with knowledge and training for how to efficiently respond in such scenarios. However, currently there are not effective systems nor methods available to quickly stop, immobilize, or delay an attacker prior to the police or other authorities arriving to the scene. A system and method for identifying an attacker and stopping or slowing that attacker, while the necessary authorities have adequate time to arrive, could save countless lives.

Many buildings include a drop ceiling made up of a grid of intersecting metallic strips, or "T-bars," suspended from the structure of the building. These T-bars are typically made of ferrous material, but can be alternatively made of other types of metals, and they are typically arranged in a criss-cross pattern which forms square-shaped or rectangular openings. These openings are generally configured to receive ceiling tiles, light fixtures, vents, and other fixtures having corresponding square or rectangular shapes. With the prevalence of such metal T-bar ceilings, particularly in schools, banks, stores, and other gathering places, magnets provide a mode for easily suspending objects from a substantial number of ceilings. One such example of an object suspended by magnetic connection with ferrous ceiling T-bars is the magnetic support and transport system disclosed in U.S. Pat. No. 5,049,218, which is incorporated herein by reference in its entirety. While some buildings do not have T-bar ceilings, it is still very common for there to be various metal structures near the entrances of a building, which could allow for suspension of magnetically connected objects. Additionally, metal tracks can be easily installed onto other types of ceilings and walls to accommodate use of magnetic objects.

Heretofore there has not been available a remotely-controlled, magnetic system or method for prevention and/or suppression of intruder attacks with the advantages and features of the present invention.

SUMMARY OF THE INVENTION

The present invention discloses a remotely-controlled, movable, magnetic system and method for surveillance and attack prevention. In an exemplary embodiment, the system includes a motive apparatus having a mounting body mounting a series of magnets for creating a connection by magnetic pull or interaction between the apparatus and a metal ceiling T-bar grid or alternative metal track or structure and suspending the apparatus from the metal grid, track, or structure. The system mounting body further includes a series of wheels or rollers which make contact with the metal T-bars, metal track, or metal structure; provide some space between the magnets and T-bars, track, or structure; and allow for movement of the system along the T-bar grid, metal track, or metal structure.

The present invention includes a power source, a processor, a communications network, and an input/output interface for receiving commands from a remote device and for controlling outputs of different components of the system. At least one of the wheels or rollers is drivably connected to a drive motor for moving the motive apparatus along the T-bar grid, metal track, or metal structure. The remaining wheels or rollers not connected to the drive motor are free spinning for aiding in movement of the motive apparatus along the T-bar, metal track, or metal structure, as controlled by the one or more wheels driven by the drive motor. In an exemplary embodiment, the mounting body also includes guide plates for keeping the motive apparatus on the T-bar grid, metal track, or metal structure.

In an aspect of the present invention, the motive apparatus further includes a rotational component positioned below a central magnet of the mounting body configured for rotating the apparatus about a central axis accommodating motion of the apparatus in a direction perpendicular to the previous direction of the apparatus. Such a rotational component allows for motion in multiple directions along a T-bar grid or alternative metal track without removal of the motive apparatus from the T-bar grid or alternative metal track.

In a further aspect of the present invention, the motive apparatus is configured for mounting components and tools from the mounting body for observing, identifying a potential attacker, and hindering a potential attack. One or more of the mounted components may be controllably released from the system on demand using a remote controller device to assist in identifying, marking, and/or deterring an attacker. These components and tools may include, but are not limited to, cameras, colored dye sprays, oil-based sprays, spray nozzles, stun guns, lasers, lights, stun grenades, smoke grenades, odor grenades, microphones, smoke detectors, odor detectors, and combinations thereof. Systems of the present invention can be customized with as many or as few of these components and tools as desired for a particular location.

In another aspect of the present invention, the system may include an integrated mobile application and/or web interface for use on a remotely located smart device or computer for controlling movement of the surveillance and attack prevention system motive apparatus and movement and/or deployment of its various components.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

Figure 1:
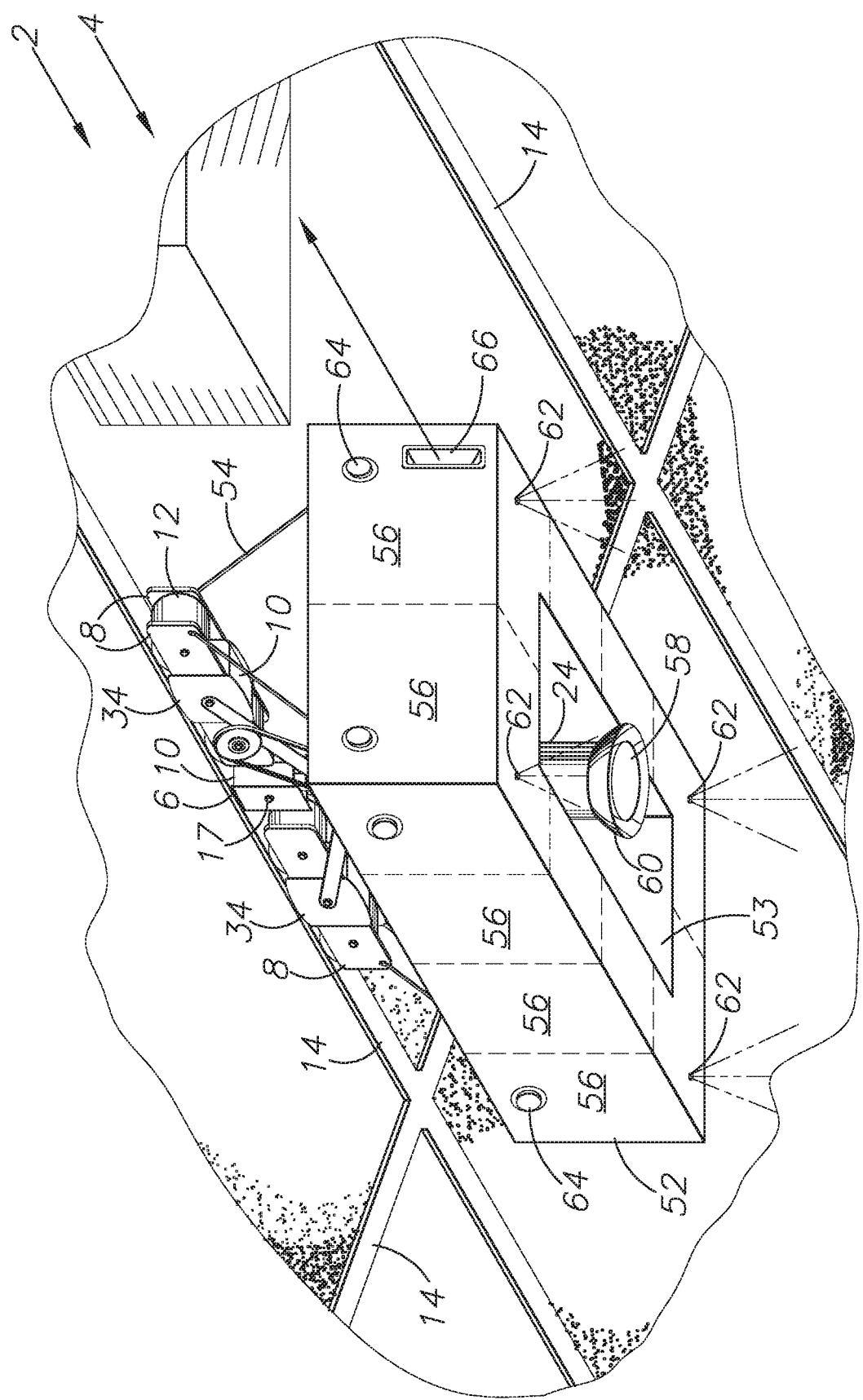
FIG. 1 shows a bottom, perspective view of a motive apparatus of a remotely-controlled, magnetic surveillance and attack prevention system embodying the present invention suspended from a ceiling T-bar grid.
Figure 2:
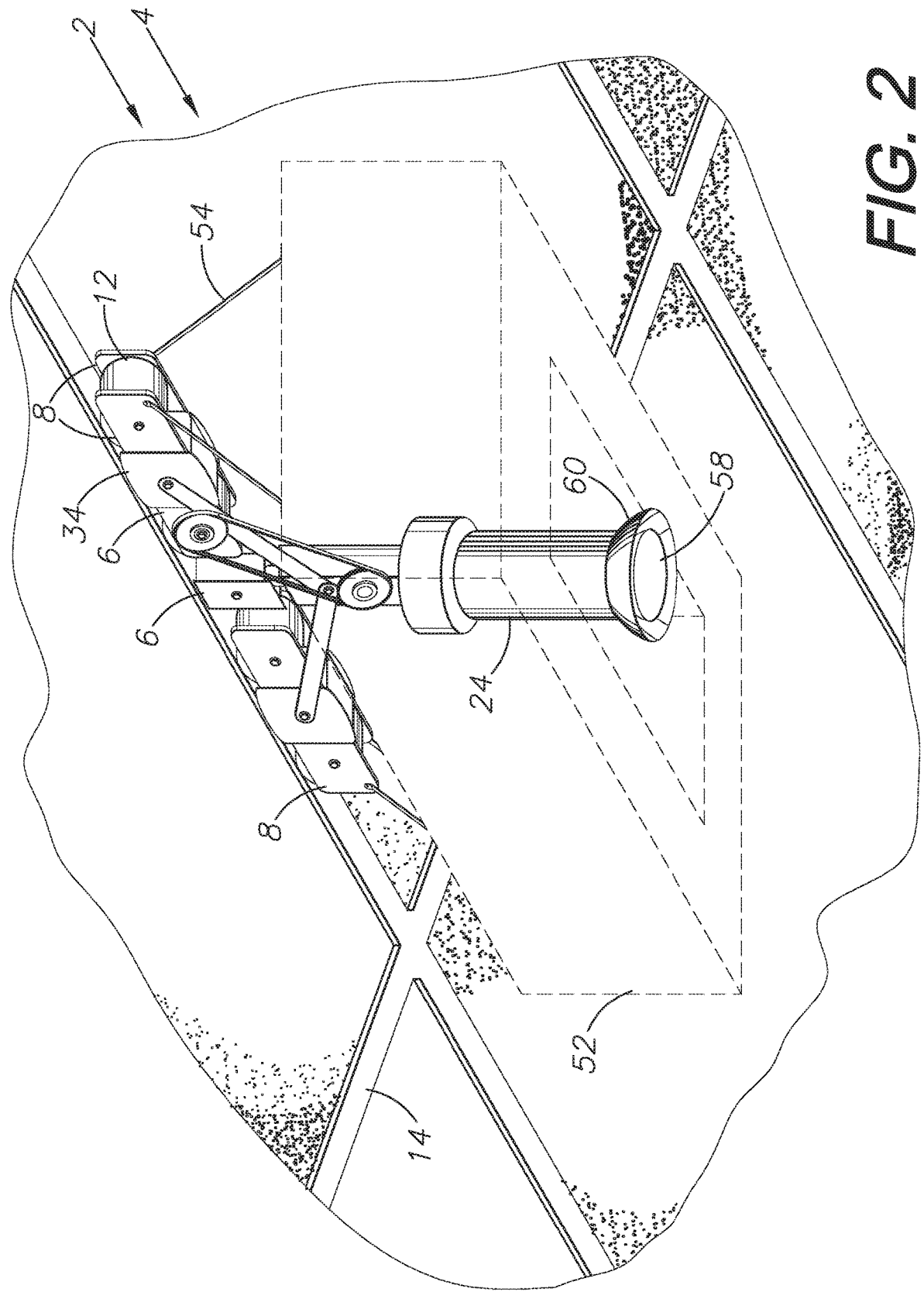
FIG. 2 shows a bottom, perspective view of the motive apparatus with a lower body shown in phantom lines to display additional features of the apparatus.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof, and words of similar meaning.

II. Preferred Embodiments

The present invention covers a remotely-controlled, magnetic, movable, surveillance and attack prevention system and method. Referring to the drawings in more detail, FIGS. 1-9 illustrate an exemplary embodiment of a surveillance and attack prevention system 2. In this embodiment, the surveillance and attack prevention system 2 includes a motive apparatus 4 having a mounting body or chassis 6 configured to mount a series of magnets 10, a series of wheels or rollers 12, and a number of active and/or passive surveillance and/or attack prevention tools and components. The mounting body or chassis 6 includes side panels 8 on opposing outer, longitudinal sides accommodating attachment of the tools and components of the surveillance and attack prevention system 2.

The system mounting body 6 includes a series of magnets 10 configured for providing magnetic interactions or connections with metal structures, such as iron T-bar ceiling grids 14 which commonly make up drop ceilings, and for accommodating suspension of the motive apparatus 4. Ferrous T-bar grids 14 are generally suspended from a superstructure by hanger wire 15 or other hanging means and configured for receiving ceiling tiles, light fixtures, vents, and other fixtures. T-bar grids 14 generally have load carrying capacities much greater than the weight of the ceiling, making them an excellent option for suspension of a motive apparatus 4 without affecting the structural soundness of the ceiling. Alternatively, instead of suspension from a T-bar grid 14, a metal track can be installed, as desired, for suspension of a surveillance and attack prevention system motive apparatus 4 of the present invention. Such a metal track could be installed on a ceiling, on a wall, or in any other position preferred for the particular location of use. The present system may also be suspended on other magnetic metal structures such as metal telephone poles, flagpoles, door frames, etc. The magnetic interaction between the magnets 10 and metal grid 14, track, or structure of the present invention must be strong enough to hold the weight of the motive apparatus 4 and counteract gravitational forces. To increase the magnetic interaction between the motive apparatus 4 and a T-bar track 14, additional iron or other magnetic metal may be attached to the grid via adhesive or other fasteners.

In an exemplary embodiment, the magnets 10 attach to the mounting body 6 side panels 8 via bolts 17 through bores 18 in the magnets 10. In a preferred embodiment, the bolts 17 are made up of a non-magnetic metal so they can be more easily attached to and removed from the system 2, as needed. Other metal components of the present invention, other than the magnets 10 and optional metal track, can be made of non-magnetic metals or magnetic metals such as iron, which would increase the magnetic interaction between the motive apparatus 4 and the T-bar grid 14 or metal track. In an exemplary embodiment, grooves 20 in the side panels 8 allow for adjustment of the height of the magnets 10 relative to the rest of the mounting body 6, as desired, to increase or decrease the magnetic interaction of the motive apparatus 4 with the T-bar grid 14 or metal track.

The surveillance and attack prevention system 2 includes a series of wheels or rollers 12 rotatably mounted on the mounting body 6 and configured for making contact with the metal T-bars 14 or metal track or structure. The wheels or rollers 12 of the present invention accommodate movement of the motive apparatus 4 along a metal T-bar grid 14, track, or structure. In an exemplary embodiment, the wheels 12 of the present invention are longitudinally positioned in alternating fashion with, or between, the magnets 10. Each wheel or roller 12 is attached to an axle 22 which is rotatably attached to the side panels 8 of the mounting body 6.

One or more of the wheels or rollers 12 is drivingly connected to a drive motor 24, which motor 24 controls the movement of the wheels or rollers 12 to move the motive apparatus 4 along the T-bar grid 14 or metal track. In an exemplary embodiment, the drive motor 24 controls movement of one or more of the wheel drive axles 22 via gears 26a,b,c,d and one or more drive belts 28. In this embodiment, within an enclosed compartment 25 attached to the drive motor 24, a horizontal, beveled gear 26a is configured for being turned by the drive motor 24 and for meshing with an internal, vertical, beveled gear 26b. The vertical, beveled gear 26b shares a gear axle 27 with an outer gear 26c. Outer gear 26c drivably connects via a drive belt 28 to a gear 26d which is connected to a primary wheel drive axle 23. Preferably, each drive belt 28 of the present invention includes teeth for making contact with toothed gears. However, alternative types of drive belts may be used.

Figure 10:
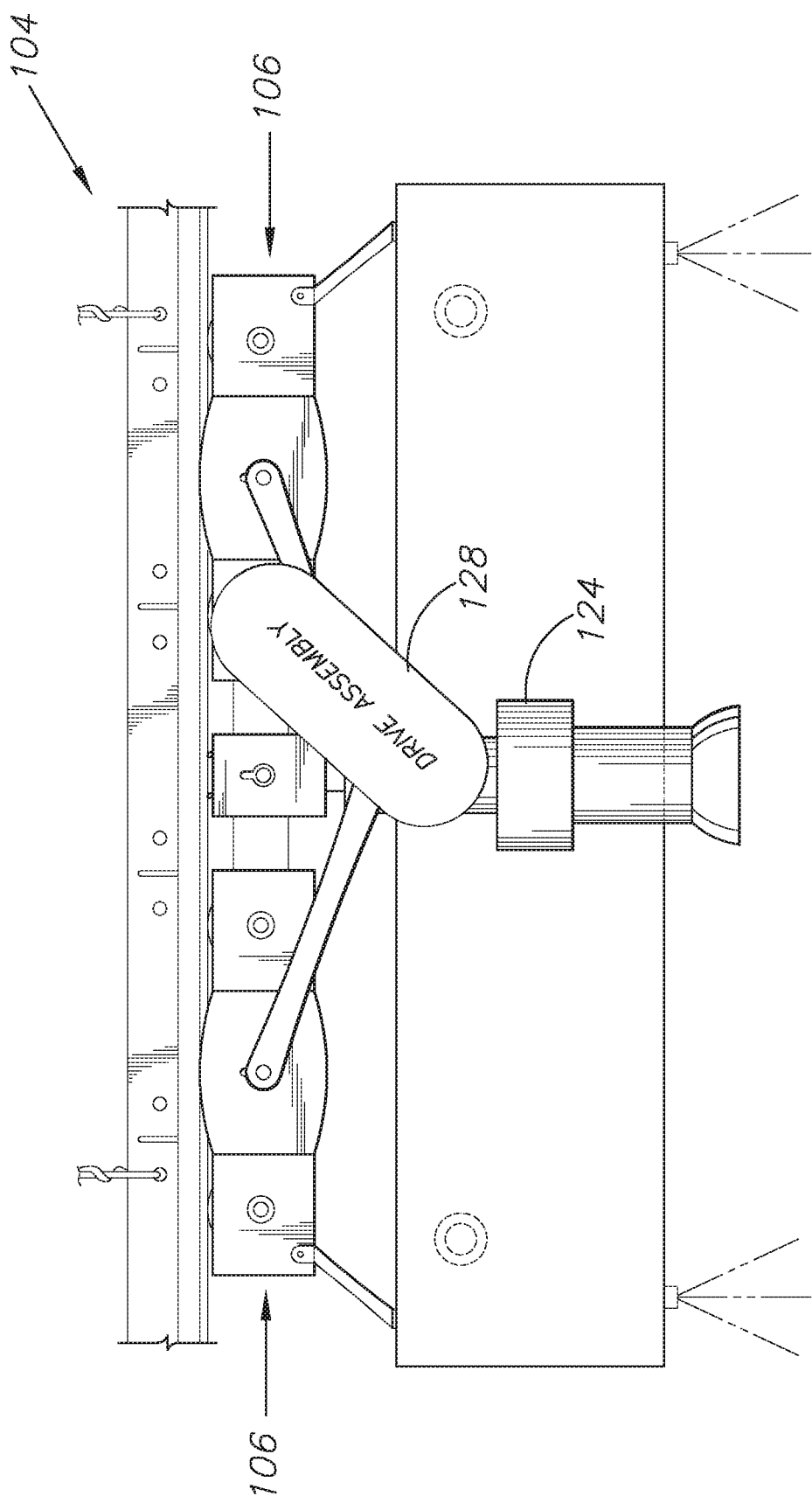
FIGS. 10-11 show side, elevational views of an alternative embodiment of a motive apparatus of the present invention.
Figure 11:
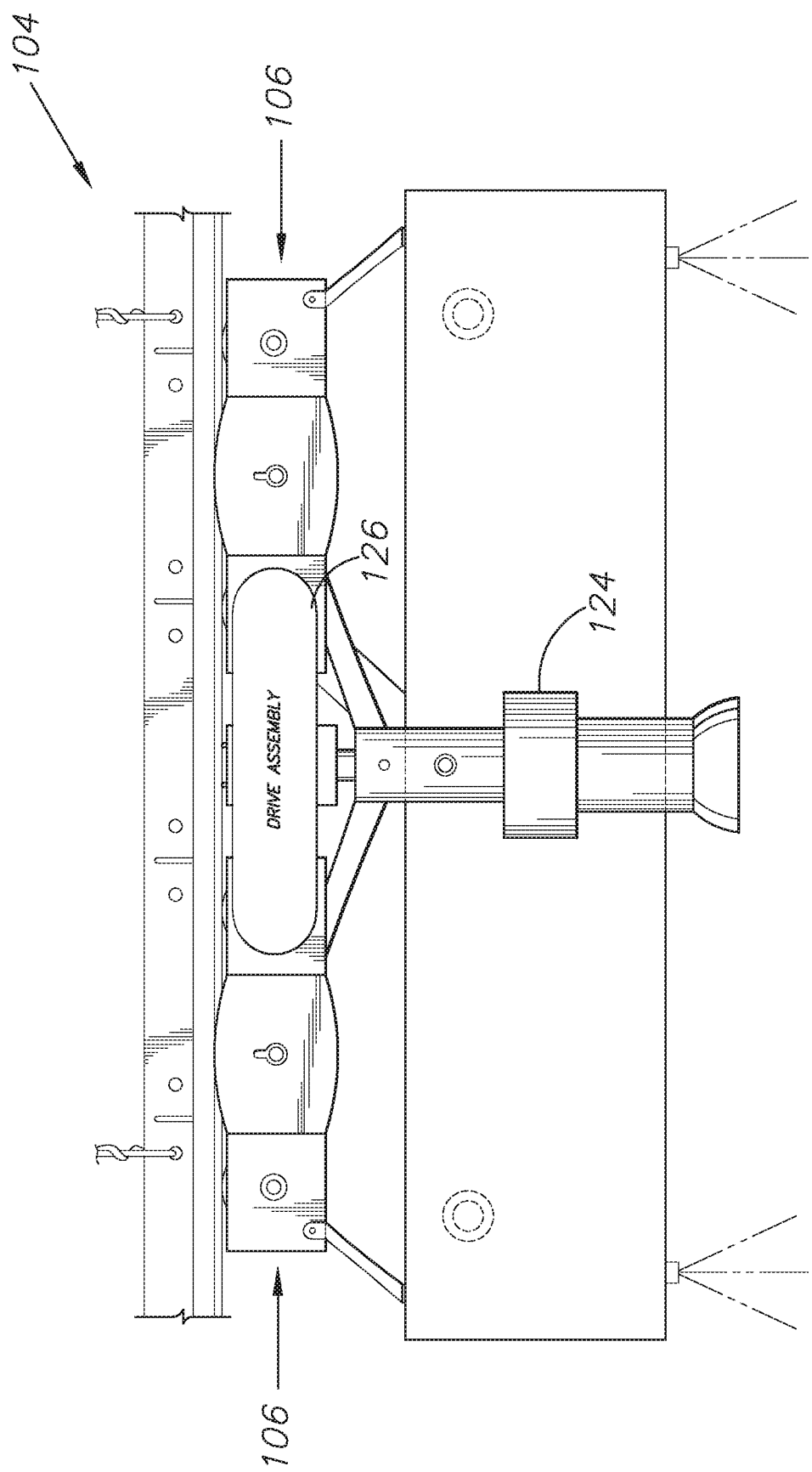
Figure 12:
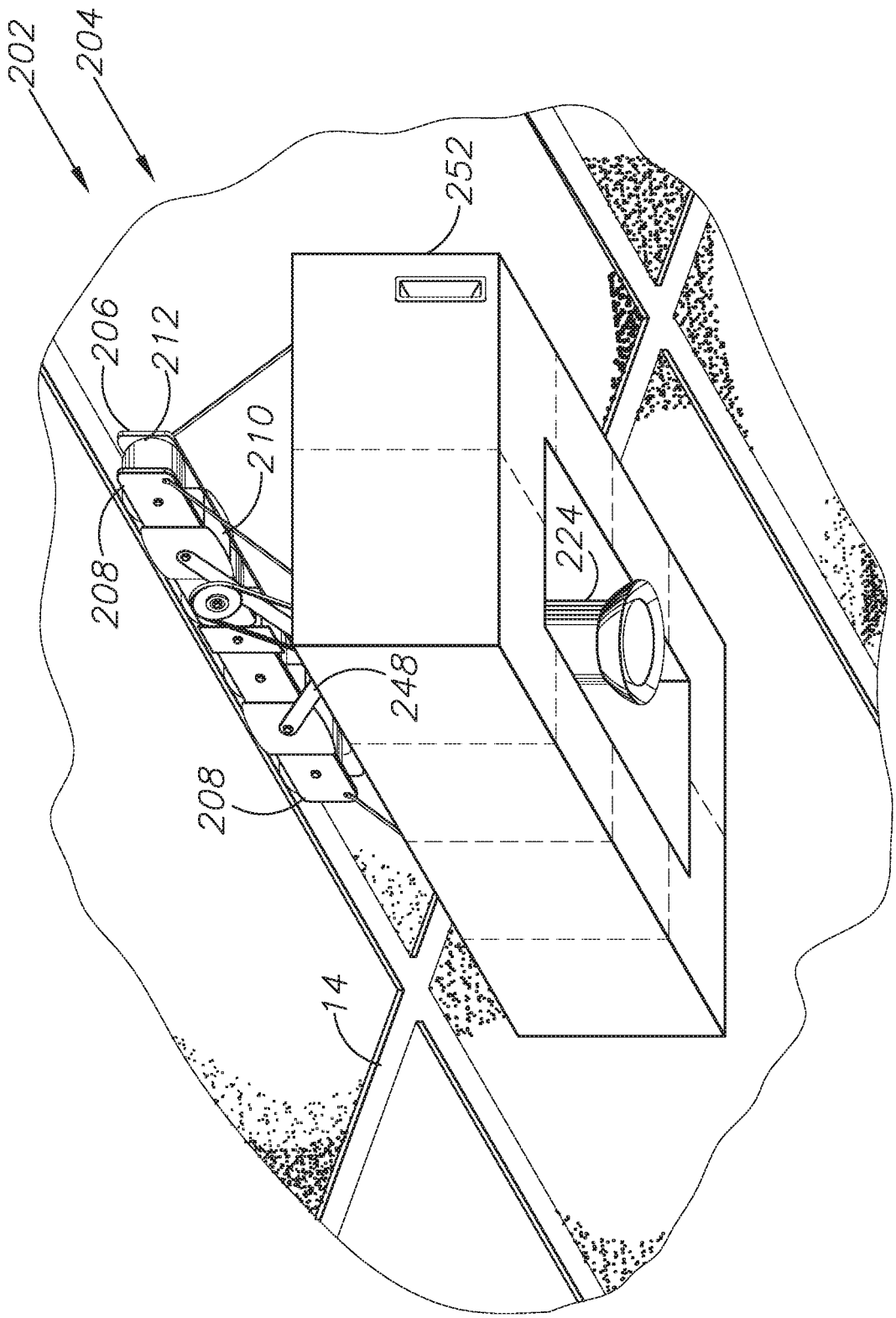
FIG. 12 shows a bottom, perspective view of another embodiment of a motive apparatus of the present invention suspended from a ceiling T-bar grid.
Figure 13:
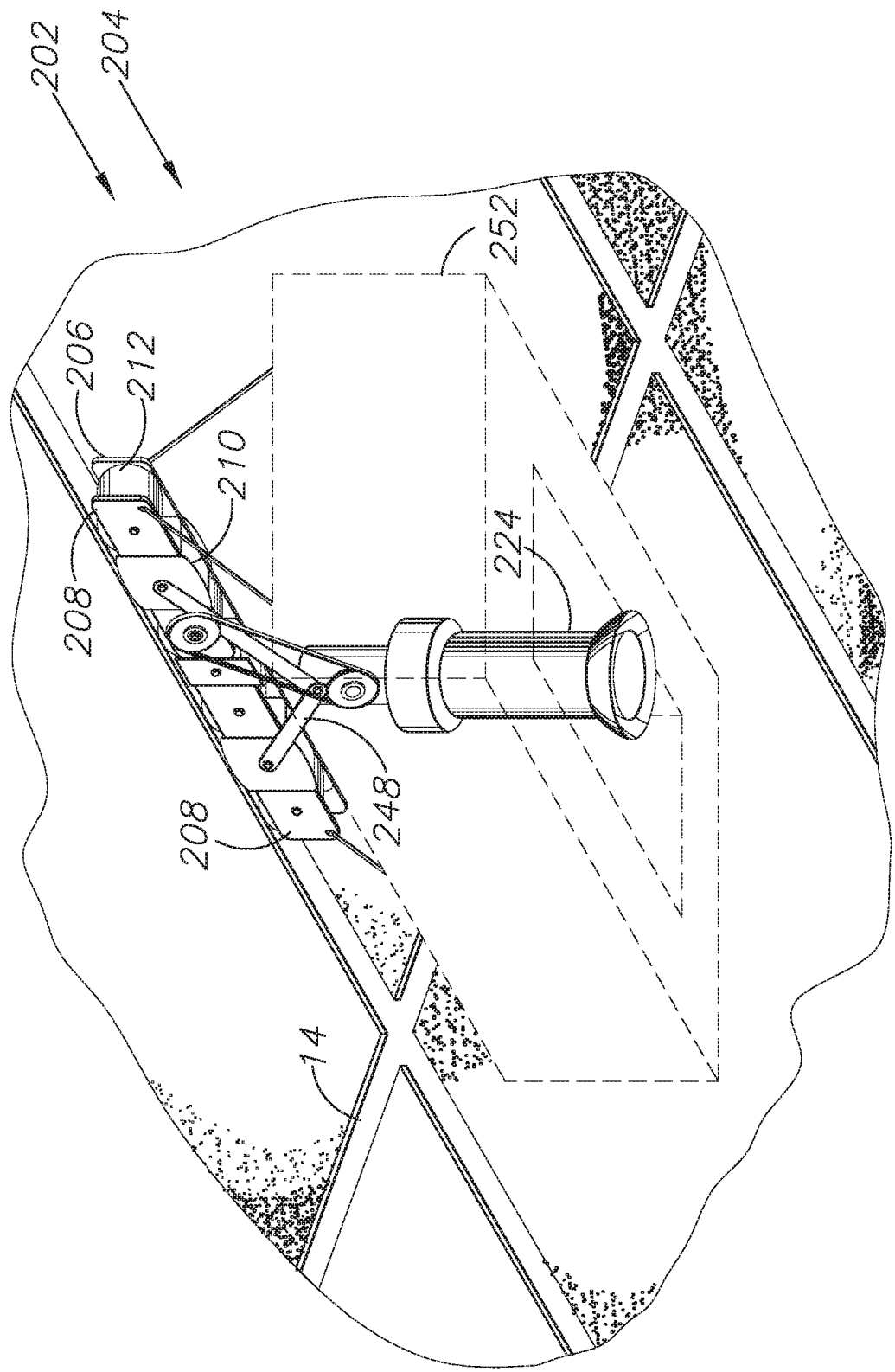
FIG. 13 shows a bottom, perspective view of the motive apparatus with a lower body shown in phantom lines to display additional features of the apparatus.
Figure 14:
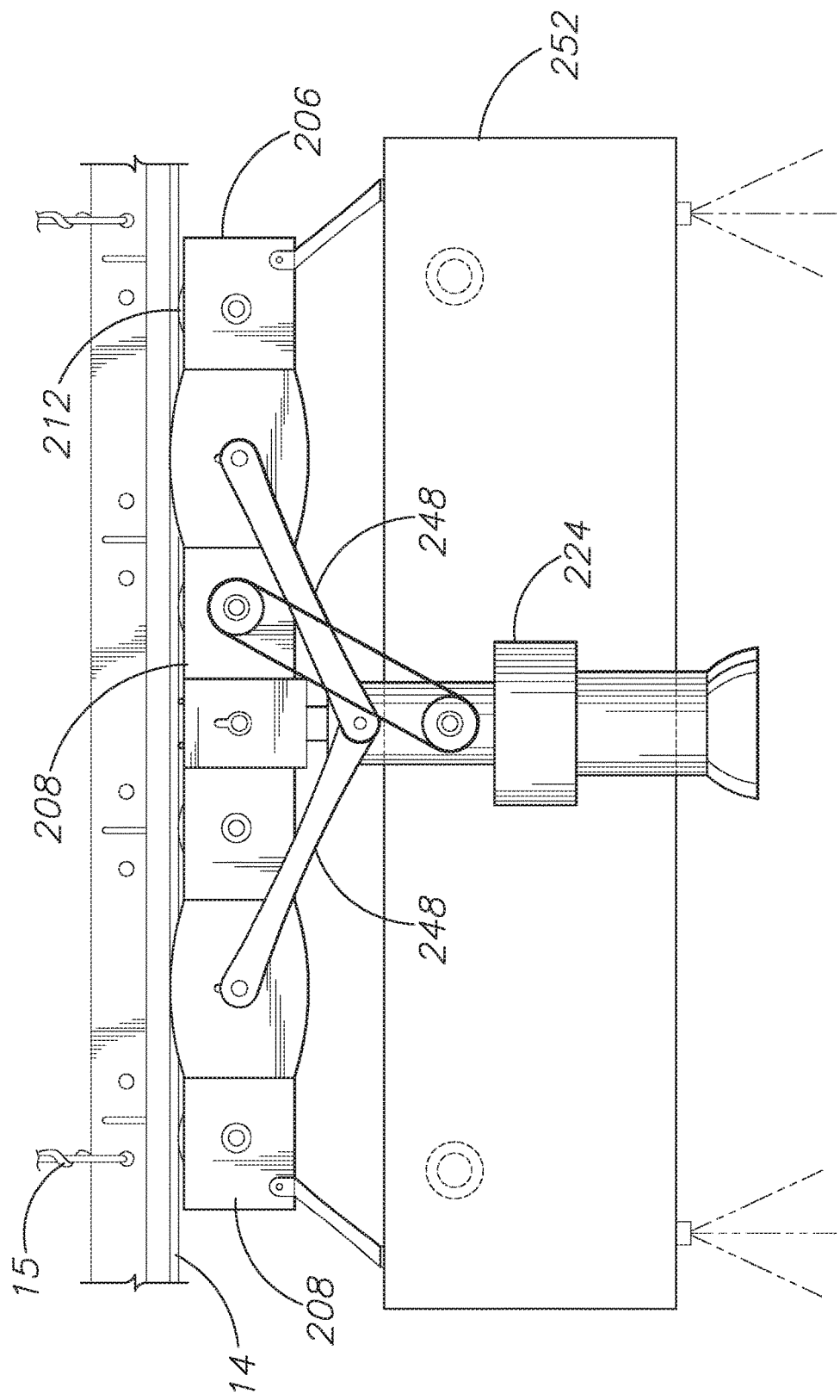
FIG. 14-15 show side, elevational views of the motive apparatus of the present invention.
Figure 15:
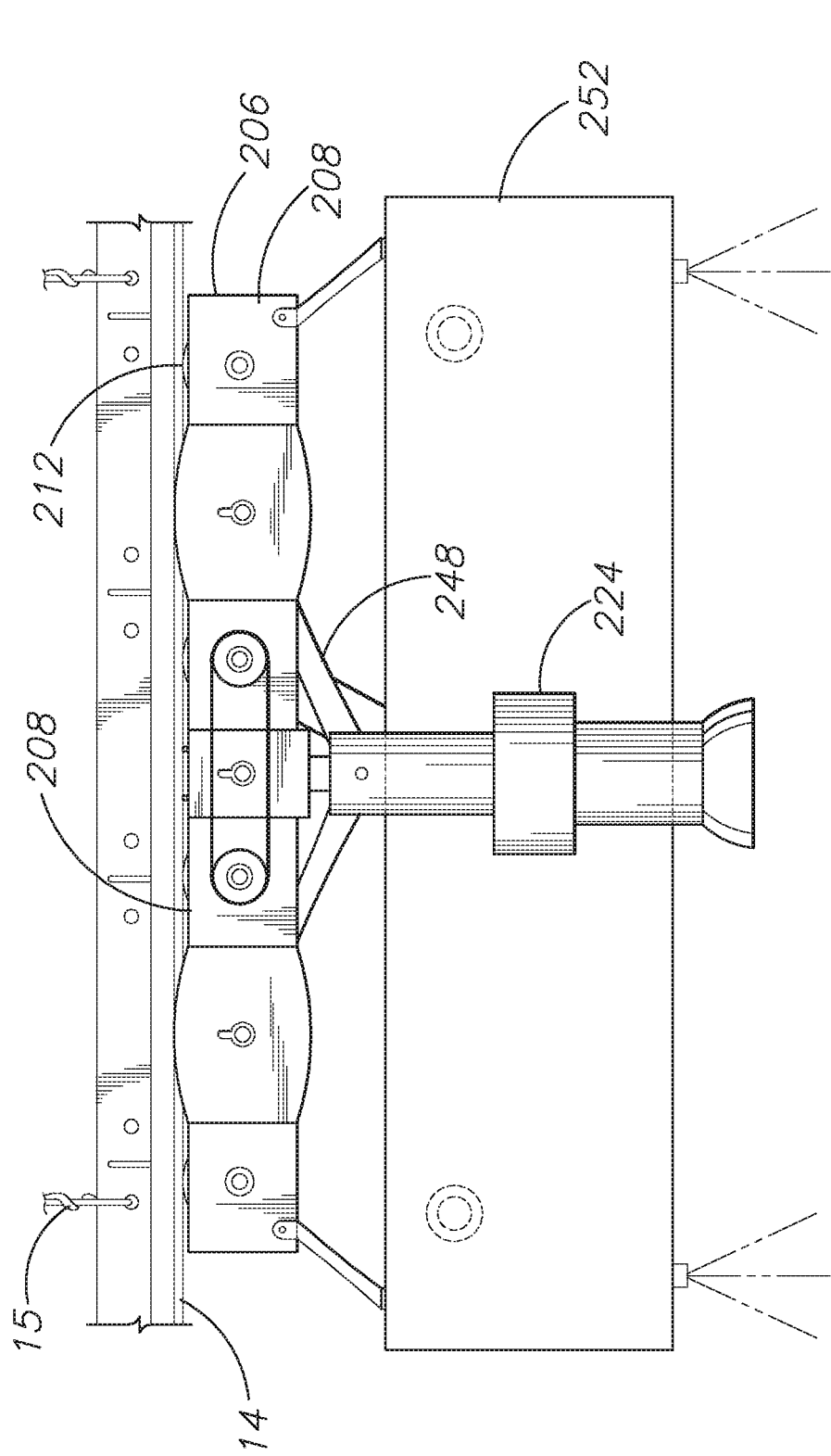
Figure 16:
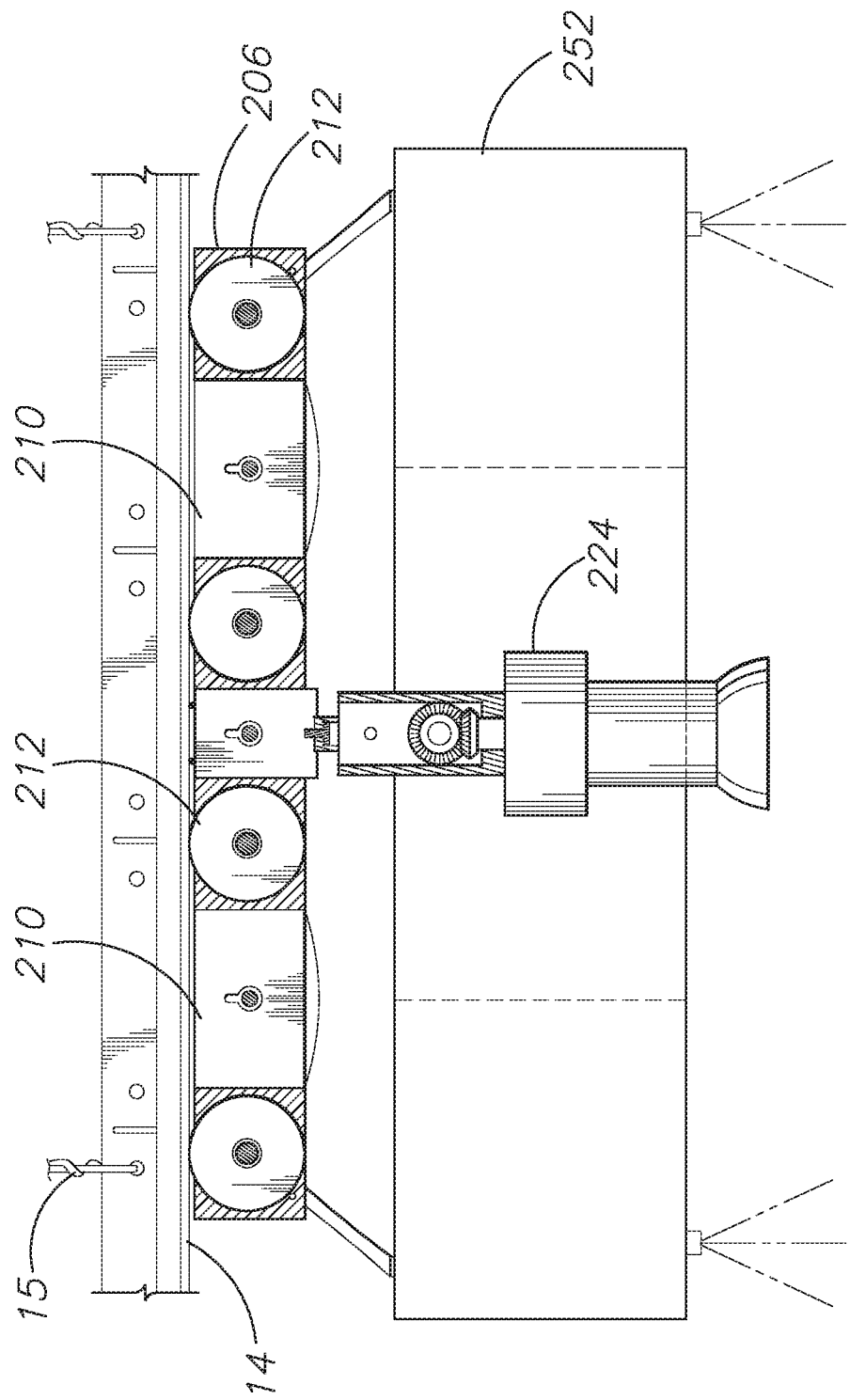
FIG. 16 shows a side, elevational, cross-sectional view of the motive apparatus of the present invention.

In alternative embodiments, gears without a drive belt, whether within a gearbox, exposed, or a combination, may be used to drive the wheels of a mounting body of the surveillance and attack prevention system. Pulley and belt mechanisms, sprockets, and/or drive chains may also be used as a drive assembly. Further alternative driving mechanisms may be utilized to move the wheels of embodiments of the present invention. FIGS. 10-11 show an alternative embodiment of a motive apparatus 104 having mounting body 106 with an alternative drive assembly 126. The drive assembly 126 attaches to a drive motor 124 for moving the motive apparatus 104.

The drive motor 24 of the present invention can be configured for forward and reverse movement. In further embodiments, the surveillance and attack prevention system 2 may include multiple drive motors for controlling movement in multiple directions, allowing for forward, reverse, and side-to-side movements. In a preferred embodiment, the drive motor 24 is mounted from the mounting body 6 below a central magnet 30, helping to keep the weight of the motive apparatus 4 relatively evenly distributed.

In an exemplary embodiment, shown in FIGS. 1-9, a second wheel or roller axle 22 is drivingly connected to the primary driven wheel or roller axle 23 via additional gears 26e,f and a secondary axle connection drive belt 29. Gear 26e connects to the primary driven wheel axle 23 on an opposite side of the mounting body 6 from gear 26d. Gear 26f is connected to the axle 22 of a separate wheel 12 and drivingly connected to gear 26e. Based on this configuration, the two inner wheels 12 are driven by the drive motor 24. Two additional wheels or rollers 12 are free spinning and aid in the movement of the motive apparatus 4 along the T-bar grid 14 or metal track. Alternatively, more or fewer wheels 12 may be drivably connected to the drive motor 24 via gears, sprockets, drive belts, and/or other driving mechanisms. FIG. 11 shows an embodiment of a motive apparatus 4 having an alternative wheel axle to wheel axle drive assembly 128.

Figure 8:
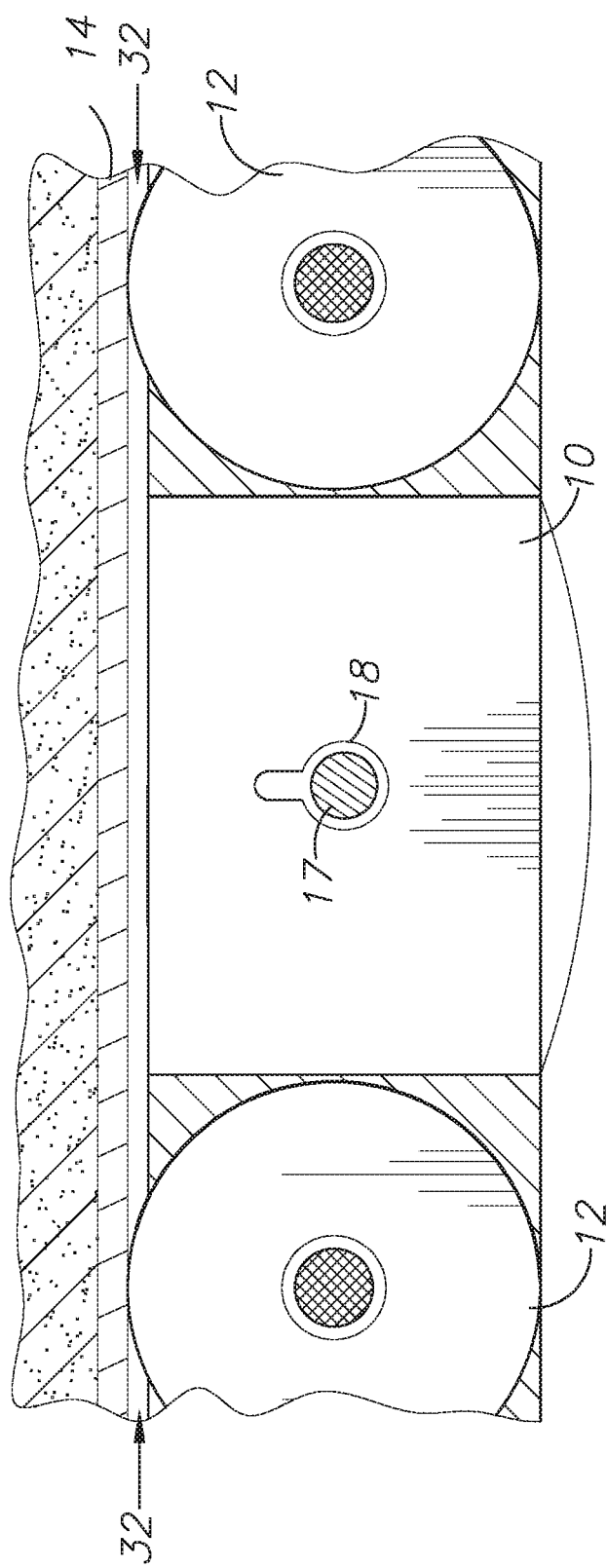
FIG. 8 shows an enlarged, fragmentary, side, elevational, cross-sectional view showing spacing between a magnet of the present invention and a ceiling T-bar.
Figure 9:
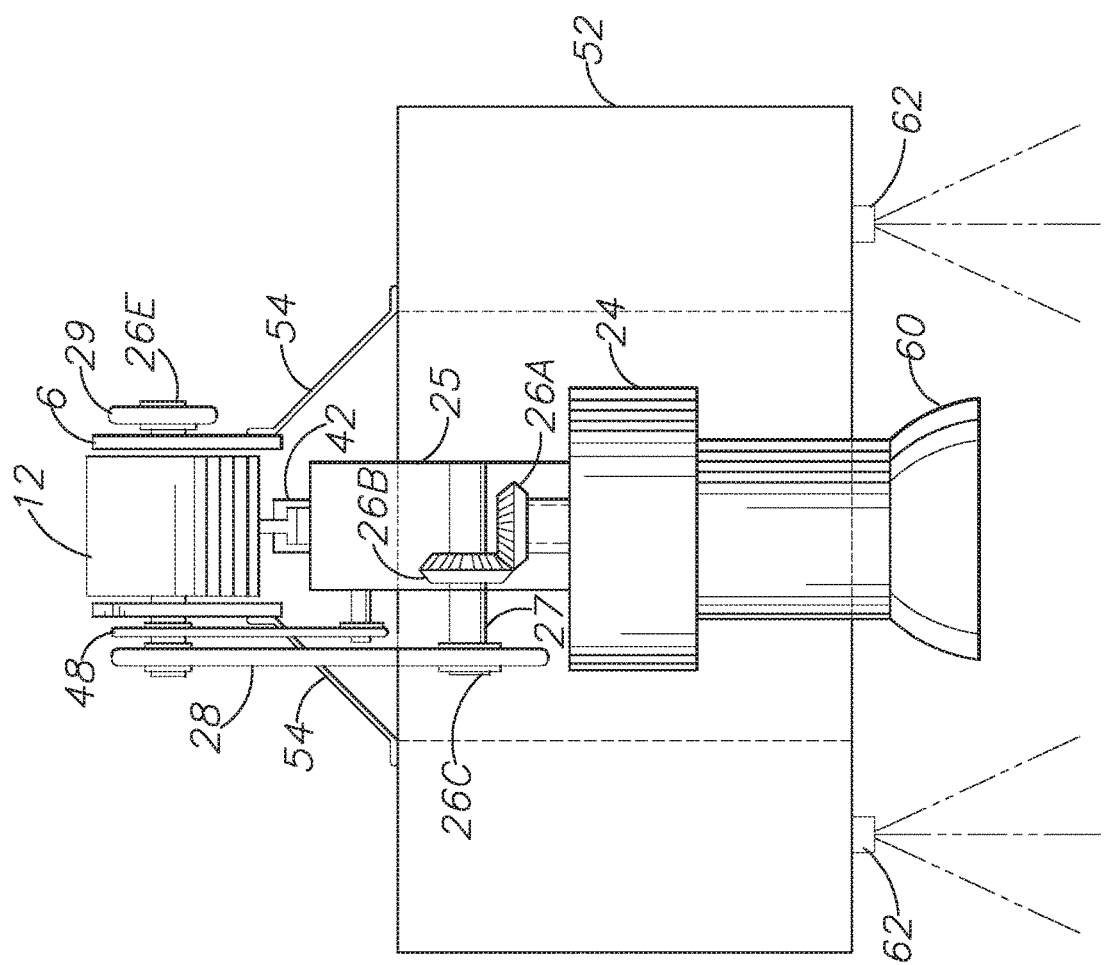
FIG. 9 shows a front, elevational, cross-sectional view of the motive apparatus of the present invention along line 9-9 of FIG. 5.

In a preferred embodiment, the wheels or rollers 12 extend distally upwards above the upper distal ends of the magnets 10, resulting in some space 32 between the magnets 10 and the metal bars 14, track, or structure, as illustrated by FIG. 8. Such space 32 between the magnets 10 and the metal bars 14, track, or structure provides added ease of movement of the motive apparatus 4 along the metal grid 14 or track. In this embodiment, the wheels or rollers 12 must be made up of a durable material not susceptible to breaking or compressing under strong magnetic pressure.

The surveillance and attack prevention system 2 further includes guide plates 34 attached to the outside of the side panels 8 of the mounting body 6 via bolts or screws. The guide plates 34 each extend distally upwards past the upper end of the side panels 8 and the most distal point of the wheels 12. The extended upper ends of the guide plates 34 are intended to be positioned on either side of the metal T-bar grid 14 or track while the system 2 is in use to aid in keeping the motive apparatus 4 properly aligned on the grid 14 or track while the apparatus 4 is moved along the grid 14 or track. In a preferred embodiment, the guide plates 34 are positioned longitudinally on the mounting body side panels 8 approximately even with the longitudinal positions of the magnets 10 so that the guide plates 34 are positioned between the wheels or rollers 12. However, guides can be positioned in alternative longitudinal locations on the mounting body of the present invention. In an exemplary embodiment, the guide plates 34 each include a groove 20 which accommodates loosening the guide plate 34 bolts or screws and adjusting the height of the guide plates 34 relative to the mounting body 6, as desired for a particular location T-bar grid 14 or track. Preferably, the upper, distal ends of the guide plates 34 have an arcuate shape so that if the guide plates 34 make contact with a ceiling tile, light fixture, or other object, the guide plates 34 slide over the object and do not derail the motive apparatus 4 from the grid 14 or track. The guide plates 34 may also have some spring-loaded give to allow the guides 34 to slide down if they make contact with an object on the ceiling or near the track.

In an exemplary embodiment, the surveillance and attack prevention system 2 includes a power source, a processor, an input/output interface, and a communications network. In a preferred embodiment, the power source is a rechargeable lithium battery. The system may include a charging input port 66 configured for mating with a docking station connected to a power source for recharging the battery or, alternatively, may include a charging cable for connection to a power source. Other embodiments may include replaceable lead batteries, a power cord for plugging into an electrical outlet, a power cord with a battery backup, or any other mechanism to power the surveillance and attack prevention system 2. Such a charging power cord can plug into a USB port or alternative charging port on the apparatus 4 or be permanently attached. In embodiments utilizing a metal track, the system 2 may be powered through the track, with the track connected to a power source and the system motive apparatus 4 connected to the track via a power cord.

Figure 3:
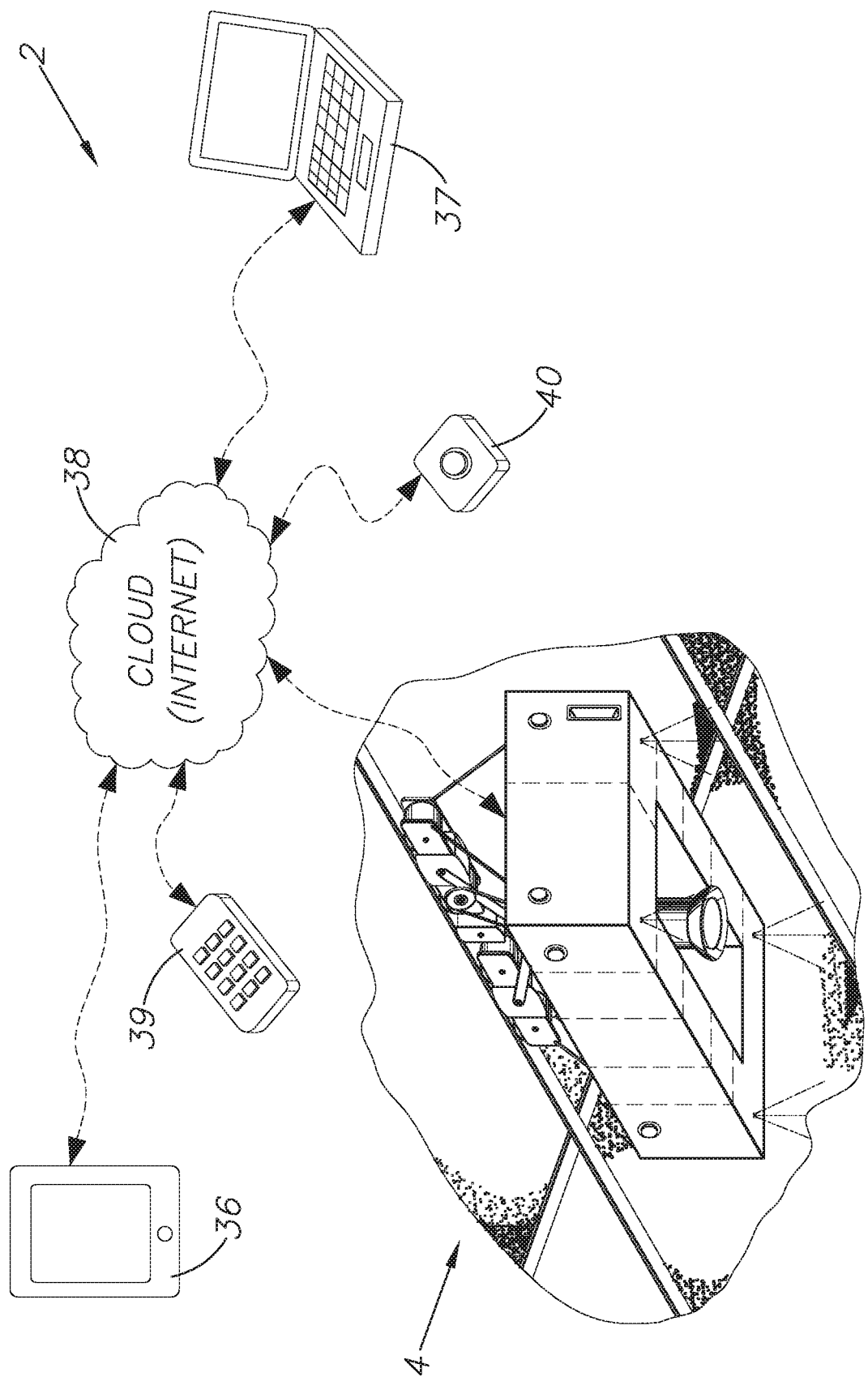
FIG. 3 shows a block diagram of the surveillance and attack prevention system including the motive apparatus and remote devices connected via the cloud or Internet.
Figure 4:
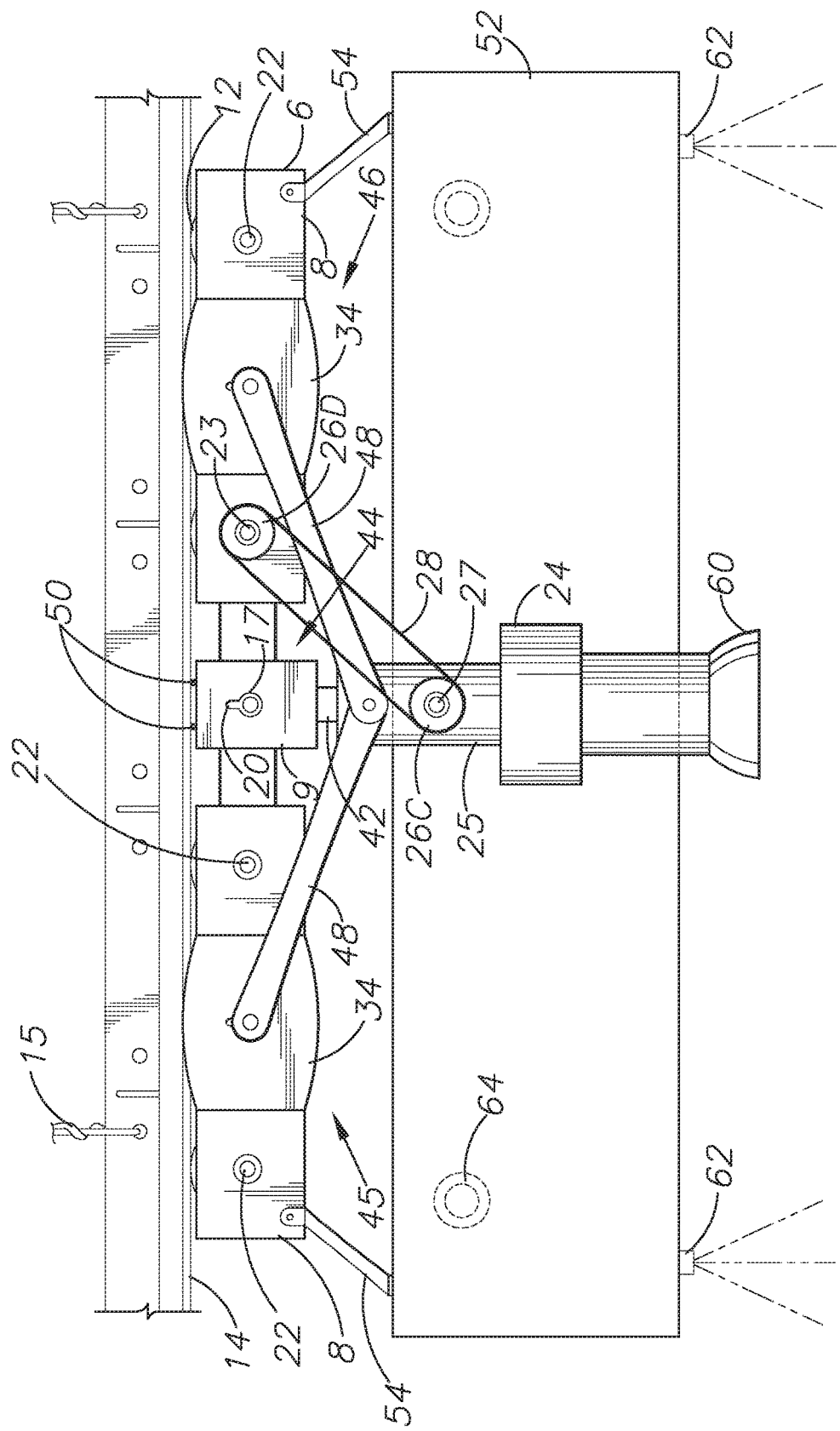
FIG. 4 shows a side, elevational view of the motive apparatus of the present invention.
Figure 5:
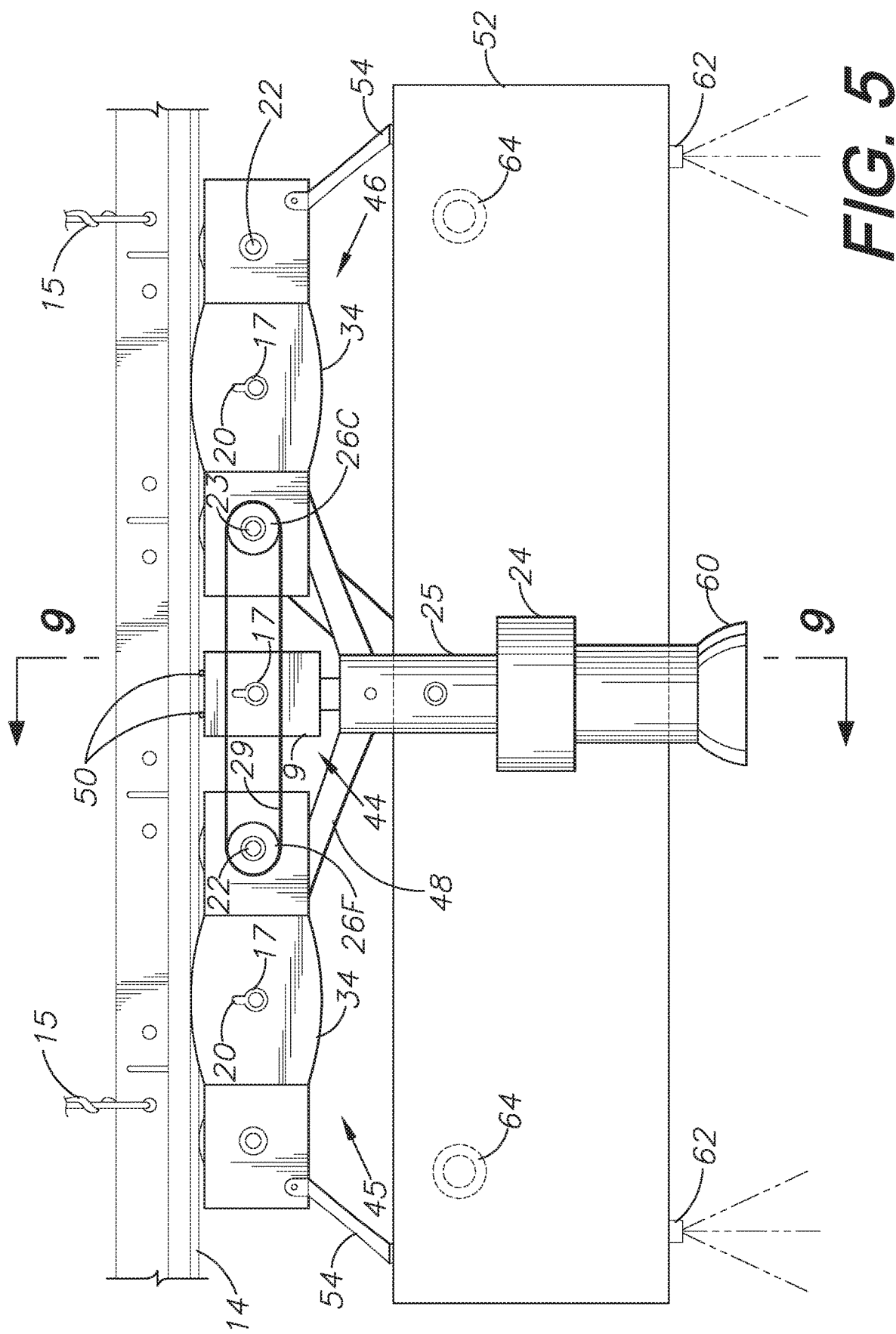
FIG. 5 shows an opposite, side, elevational view of the motive apparatus of the present invention.
Figure 6:
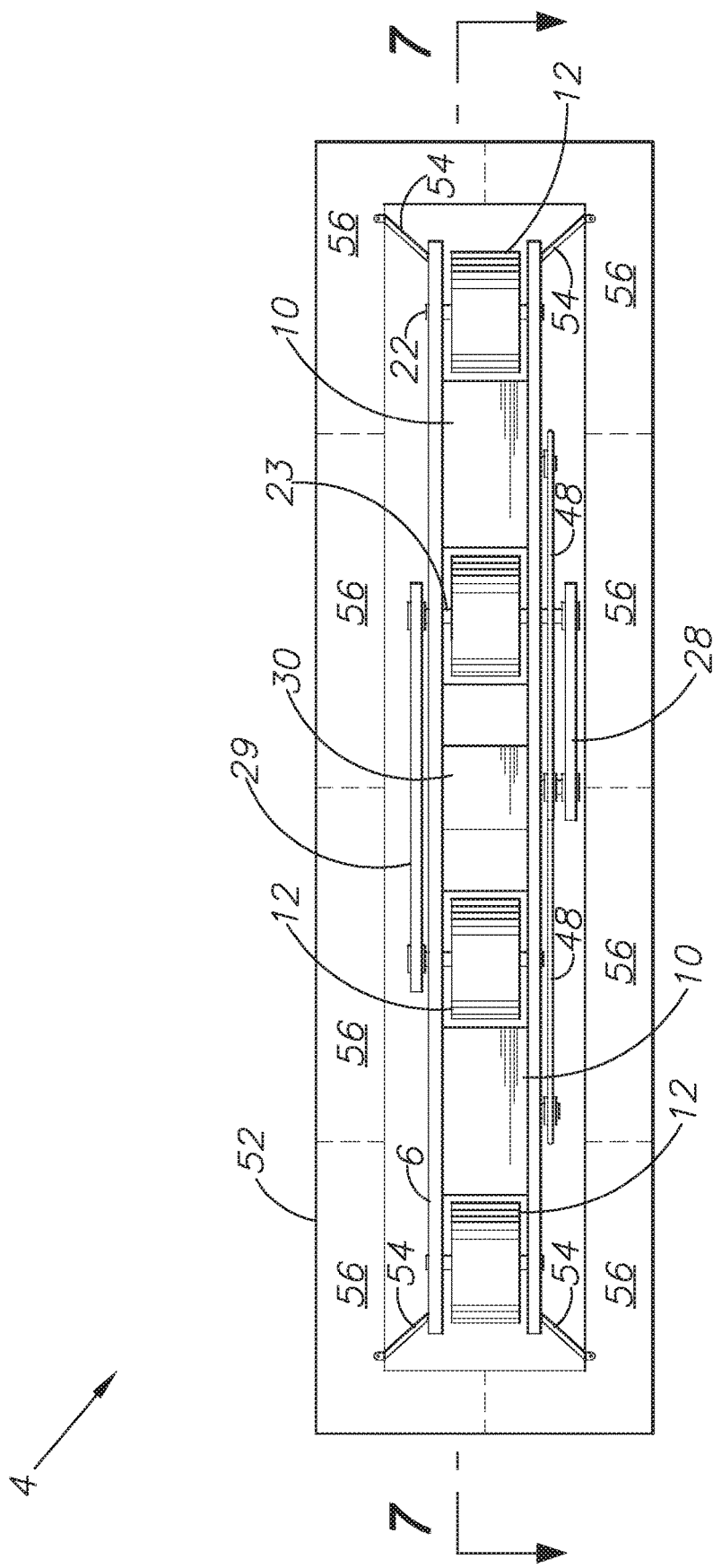
FIG. 6 shows a top, plan view of the motive apparatus of the present invention.
Figure 7:
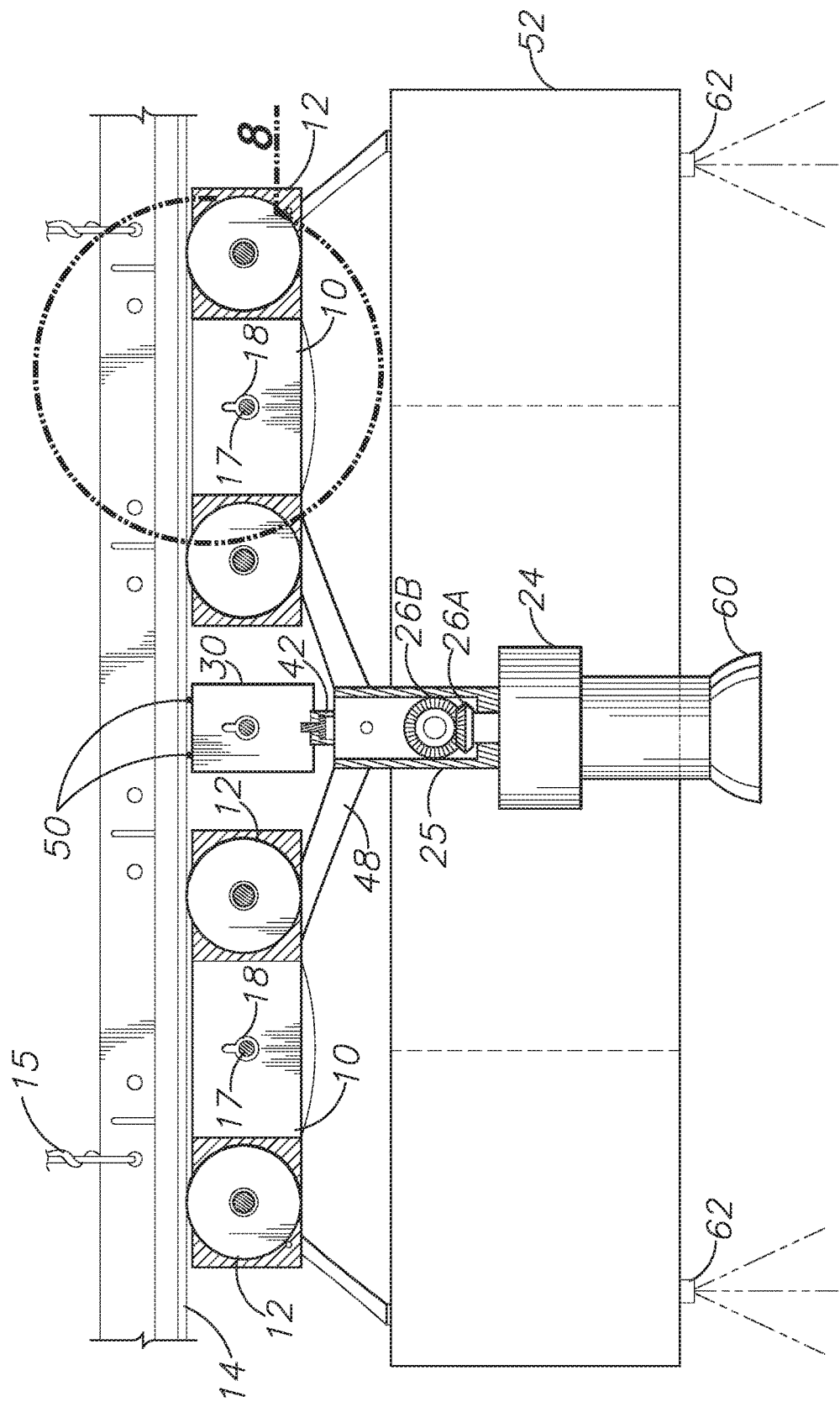
FIG. 7 shows a side, elevational, cross-sectional view of the motive apparatus along line 7-7 of FIG. 6.

The drive motor 24 of the present invention, which is configured for controlling movement of the motive apparatus 4 along the T-bar grid 14, metal track, or metal structure, is electrically connected to the processor. The processor is further electrically connected to the input/output interface or module, and the processor is configured for controlling operation of the motor 24 upon receiving control inputs from a remote computing device or remote control via a communications network 38. Such a remote computing device may be a smart device 36, such as a tablet computer or a smartphone, or a computer 37, such as a laptop computer or a desktop computer. The communications network 38 of the present invention may be the internet or an intranet, such as a local area network (LAN) or wide area network (WAN). The surveillance and attack prevention system 2 may further include a Bluetooth and/or other radio frequency receiver connected to the processor and configured for receiving Bluetooth and/or other radio frequency input transmissions from a remote computing device 36, 37 or remote control 39 for controlling operation of the system 2. FIG. 3 illustrates an embodiment of wireless connection of the motive apparatus 4 and remote devices via the cloud or internet 38. In a preferred embodiment, the surveillance and attack prevention system 2 is configured to be isolated from the primary security system at the location of use, allowing the present invention to continue to be used should an attacker disable the primary security system prior to or during an attack situation.

The surveillance and attack prevention system 2 of the present invention may further include a rotational component 42 on the motive apparatus 4 configured for allowing rotation of the motive apparatus 4 about a central axis in approximately 90 degree increments. Alternatively, a rotational component 42 may be configured for accommodating other angular rotations better suited for a particular location of use. In a preferred embodiment, the rotational component 42 is connected to and positioned below a central magnet 30 of the mounting body 6 and includes a rotary solenoid electrically connected to the processor and a spring-loaded turning mechanism. In such an embodiment, when the spring is activated, the apparatus 4 rotates 90 degrees via the rotary solenoid. After rotation, the system 2 may be configured for immediately winding back the spring in preparation for the next turn. However, the spring may be configured for winding as the motive apparatus 4 moves along the T-bar grid 14 or track. The turning mechanism may include a limit switch which prevents the motive apparatus 4 from rotating more than 90 degrees each time the spring is activated. Other embodiments of the present invention may include alternative turning mechanisms and/or the ability to turn in multiple directions. For example, in an embodiment, rotation of the motive apparatus 4 via the rotational component may be powered by compressed air.

In a preferred embodiment, the mounting body 6 is made up of three sections: a center section 44, a front section 45, and a back section 46. Such a segmented mounting body 6 allows for more efficient rotational movement of the motive apparatus 4. The center section 44 of the mounting body 6 mounts a central magnet 30 between center section side panels 9 and connects to the rotational component 42 below. The drive motor 24 and corresponding gears in this embodiment are positioned below the central magnet 30 and below the rotational component 42. The front and back sections 45, 46 of the mounting body 6 each include a magnet 10 and two wheels or rollers 12 mounted between left and right side panels 8. In other embodiments, an alternative arrangement of magnets 10 and wheels or rollers 12 may be used for the front and back sections 45, 46. In this embodiment, the front and back mounting body sections 45, 46 each attach to the rest of the mounting body 6 via a support arm 48 attached to a side panel 8 and to a cover 25 for the drive gears 26a,b positioned below the center section 44 and rotational component 42. The motive apparatus 4 may include support arms 48 on one longitudinal side of the mounting body 6 or on both longitudinal sides of the mounting body 6. Furthermore, embodiments of the invention having a mounting body with side panels which extend the full longitudinal length of the mounting body and not split into sections 44, 45, 46, such as in the embodiment shown in FIGS. 12-16, may also include support arms 248 to further strengthen the construction of the mounting body 6.

In a preferred embodiment, the motive apparatus 4 includes a lowering mechanism for lowering both the front and back mounting body sections 45, 46 relative to the magnetic T-bar grid 14 or track prior to rotation of the motive apparatus 4. Lowering the front and back sections 45, 46 lessens the magnetic interaction between the magnets 10 and the metal T-bar grid 14 or track and removes contact between each of the front and back sections 45, 46 with the grid 14 or track in anticipation of rotation about the central axis via the rotational component 42. Lowered front and back sections 45, 46 of the mounting body 6 facilitate rotation of the motive apparatus 4 without the mounting body 6 making contact with the ceiling while turning.

Such lowering of the front and back mounting body sections 45, 46 may be accomplished utilizing one or more spring-loaded solenoids connected to the processor for pulling down the front and back sections 45, 46 to counteract the magnetic interaction. When a front and back section lowering solenoid is activated, the front and back sections 45, 46 are lowered. Once the motive apparatus 4 has rotated 90 degrees to move in a direction perpendicular to the previous direction of the apparatus 4, the one or more lowering solenoids are released and the magnetic interaction pulls the front and back mounting body sections 45, 46 back closer to the T-bar grid 14 or metal track and puts the motive apparatus 4 back into driving position. Preferably, the front and back section lowering solenoids include limit switches preventing them from lowering the mounting body 6 front and back sections 45, 46 beyond a predetermined point. Alternatively, other front and back mounting body section lowering mechanisms may be utilized. For example, the system may include air compartments configured for inflating to lower the front and back sections 45, 46 and for deflating to allow the front and back sections 45, 46 to raise back up to the grid or track. Other lowering mechanisms may also be used.

In this embodiment, the center section 44 of the mounting body 6 stays stationary on the metal T-bar grid 14 or track when the rest of the motive apparatus 4 rotates via the rotational component 42. Accordingly, the central magnet 30 must be strong enough to hold the weight of the entire motive apparatus 4 and to counteract gravitational force when the mounting body front and back sections 45, 46 are lowered for rotation. Since the central magnet 30, in this embodiment, does not rotate, the center side panels 9 do not include guide plates. In a preferred embodiment, to assist with movement along the T-bar grid 14 or track, a series of non-magnetic, free-spinning ball bearing spacers 50 are attached to the upper side of the central magnet 30. In one exemplary embodiment, the diameter of the ball bearing spacers 50 are configured to be smaller than the air space 32 formed between the magnets 10 and the metal grid 14 or track from the positioning of the wheels or rollers 12 relative to the magnets 10 to allow for closer magnetic interaction of the central magnet 30 with the grid 14 or track when the front and back mounting body section 45, 46 are lowered. The non-magnetic ball bearings 50 may be placed within grooves formed in magnet 30 itself or within grooves in a plate attached to the top side of the magnet 30. In other embodiments, such ball bearing spacers 50 may be used on the upper sides of all magnets 10 of the surveillance and attack prevention system 2.

The surveillance and attack prevention system mounting body 6 of the present invention is configured to mount a series of active and/or passive tools and components, each connected to the processor, for use in observing, identifying a potential attacker, and/or hindering a potential attack. Embodiments of the present invention can be customized to mount the appropriate and/or desired tools and components for a particular location of use. Potential integrated surveillance and attack prevention tools and components include, but are not limited to, cameras, colored dye sprays, oil-based sprays, spray nozzles, stun guns, lasers, LED lights, stun grenades, smoke grenades, odor grenades, microphones, smoke detectors, and odor detectors.

In a preferred embodiment, the motive apparatus includes a lower body 52 mounted from and suspended below the mounting body 6 via mounting arms 54. The lower body 52, in this embodiment, is configured for holding a series surveillance and attack prevention tools and components. In a preferred embodiment, the lower body 52 includes a series of compartments 56 positioned around the lower body. Each compartment 56 is configured for holding and/or releasing one or more surveillance and attack prevention tools and components. These lower body compartments 56 can be customized for the particular needs of a location using the system 2. Such compartments 56 may mount a processor, a control panel, one or more batteries, a battery charging mechanism, on/off switches, and/or other user buttons. In the embodiments shown in FIGS. 1-11, the lower body 52 forms a rectangular frame-like shape with an open center portion 53. However, the lower body 52 can be square, round, triangular, or any other shape, with or without an open center portion.

In an exemplary embodiment, many of the mounted components and tools are configured to be movable in various directions and to be adjusted by the processor, either automatically or in response to input from a remote computing device 36, 37, to provide effective surveillance and/or attack prevention tactics. The system 2 may include various limit switches associated with individual tools or components to prevent movement of the tool or component beyond a certain limit. The motive apparatus lower body 52 is configured to be hollow in order to accommodate holding and releasing liquids, gases, and/or solid objects from the motive apparatus. The lower body 52 may also include pressurized air in order to effectively release the liquids, gases, and/or projectiles. Preferably, components configured for release from the system 2 are loaded into the lower body 52 such that weight of the components self-level, with refills and/or remaining liquids distributing weight toward the center of gravity, so that the weight of the motive apparatus 4 remains relatively evenly distributed. Pressurized air in the lower body 52 could also aid in self-leveling of components. In some embodiments, pressurized air may only be included in compartments 56 for releasing components and not the other compartments 56 of the lower body 52. In other embodiments, the entire lower body 52 includes pressurized air. Such air can be pressurized utilizing replaceable compressed air canisters or alternative air pressurizing mechanisms. The level of pressurization in such embodiments is controlled by the processor based on user input via a remote computing device 36, 37 or remote control 39. The tools and/or compartments 56 may also be removable from the lower body 52 and transferable to another compartment position or onto an authorized user's person. However such transferability would require a key and/or a passcode from authorized personnel only.

One or more cameras 58 mounted on the motive apparatus 4 of the surveillance and attack prevention system 2 are positioned in order to provide surveillance of an area surrounding the system 2. Such cameras 58 can be configured for capturing video and/or still images. In a preferred embodiment, each camera 58 is configured for tilt adjustment up and down and for movement side-to-side as desired to accommodate the desired surveillance footage for the location. The processor is configured for sending surveillance footage from the one or more cameras 58 to a database connected to the system via a communications network 38 and configured for storing video footage. A remote computing device 36, 37 can be configured, with proper authorization, to view stored video footage on the database via the communications network 38. The communications network 38 can be the internet/cloud, an intranet such as a local area network (LAN), or any other computing system communication network. Cameras 58 of the present invention can be configured to record at all times, during predetermined times, or upon command by a user.

In a preferred embodiment, a camera 58 is positioned below the drive motor 24 of the present invention, with the camera lens at or near the lowest point of the motive apparatus 4 in order to have unobstructed views of the surrounding area. Optionally, the system 2 may include a shade 60 above the camera 58 so that lights from the system 2 do not affect the camera views. The system 2 may further include a retractable camera cover made of protective material, such as but not limited to Kevlar or armored metal, to protect the camera 58 when it is not in use. Such retractable protective covers could be utilized over any individual features of the surveillance and attack prevention system 2 or even over the entire motive apparatus 4 to protect the system 2 when it is not actively being used.

Additionally, one or more microphones can be positioned on the motive apparatus lower body 52 to record audio from around the location of the motive apparatus 4. The processor is configured to send audio data to the database over the communications network 38, which stores the audio data. Audio recordings recorded by the microphones of the surveillance and attack prevention system 2 can be stored independently or in conjunction with surveillance video footage. The one or more microphones can be configured to record audio at all times, during predetermined times, or upon command of a user. Audio speakers may also be mounted on the lower body 52 and configured to play loud, debilitating sounds on command from an authorized user via a remote computing device 36, 37 or remote control 39.

The surveillance and attack prevention system 2 may further include one or more tanks with associated spray nozzles 62 for holding spray liquids. In a preferred embodiment, spray nozzles 62 of the present invention can be adjusted to properly aim a spray liquid towards an attacker. One type of spray which could be effectively used in an attack scenario is a colored dye to mark an attacker for authorities. These could be bright, easily spotted dye colors or, alternatively, a dye which appears clear or non-existent under visible light but shows prominently under infrared or ultraviolet light. Another spray for use in an attack scenario could be an oil-based mix. Such an oil-based spray could be used to slow an attacker by getting in the attacker's eyes, getting on the attacker's clothing or garments, and/or creating a film on the attacker's mask that is difficult to see through and difficult to wipe off. A combined oil-based spray and dye could also be used. Operation of spray nozzles 62 of the surveillance and attack prevention system 2 can be configured to be controlled by input to a remote computing device 36, 37 or remote control 39. Preferably, such dyes and oil-based sprays would be water soluble so that any spray released onto carpet or furniture could be cleaned relatively easily.

In an exemplary embodiment, the present invention includes visual components 64 configured to make it difficult for an attacker to see and/or to identify the attacker. Such visual components 64 can include, but are not limited to, lasers and LED lights. Control and adjustment of the visual components 64 of the surveillance and attack prevention system 2 can be controlled by input to a remote computing device 36, 37 or remote control 39. Lasers can be used to distort an attacker's vision and/or to point out an attacker to authorities. Bright LED lights can be shined on an attacker to temporarily distort the attacker's vision. Such lights could be continuously shined or can be flashed. In some embodiments, multiple LED lights could be positioned in a series, and the lights could be configured for rotation. Visual components may also be arranged in a strip around a portion of the lower body 52. LED lights could also be used to identify an attacker.

The motive apparatus lower body 52 of the present invention can additionally be configured for holding and deploying projectiles, as controlled and adjusted by inputs to a remote computing device 36, 37 or remote control 39. Such projectile components may include, but are not limited to, stun guns and/or stun grenades to temporarily stun an attacker; smoke grenades to distort an attacker's view; and odor grenades to delay an attacker with an unpleasant smell. Alternative surveillance and attack prevention components can be mounted on the motive apparatus 4, as desired.

A motive apparatus 4 of the present invention may also mount one or more smoke detectors and/or odor detectors to assist in identifying attack conditions, one or more potentially dangerous odors, and/or a fire. The motive apparatus 4 may further include self-protecting features such as a Kevlar, armored metal, or other protective cover to prevent or minimize damage to the apparatus 4, particularly with the apparatus 4 not in use. The system 2 may also include an alarm system which may include integrated speakers and/or lights for signaling an alert if someone attempts to damage the surveillance and attack prevention motive apparatus 4 or move the apparatus 4 without permission. To further protect the system 2 from damage, the motive apparatus 4 may include stoppers or bumpers mounted from the mounting body 6 and/or the lower body 52 to prevent the apparatus 4 from running into a wall or other structure. Such stoppers or bumpers may be positioned on any or all sides of the motive apparatus 4.

FIGS. 12-16 show an alternative embodiment of a surveillance and attack prevention system 202. In this embodiment, a motive apparatus 204 includes a non-segmented mounting body 206 having side panels 208 which extend the full longitudinal length of the mounting body 206. Similar to the embodiments shown in FIGS. 1-11, in this embodiment, the mounting body 206 mounts a series of magnets 210 and wheels or rollers 212 attached to the side panels 208 for suspension from and movement along a ferrous T-bar grid 14 or alternative metal track or structure. A drive motor 224 drivingly connects to one of more of the wheels 212 for moving the motive apparatus 4 along the grid 14 or track. The mounting body 206 further mounts a lower body 252 configured for holding, deploying, and/or releasing tools and/or components for surveillance, attack prevention, and/or attack suppression. This embodiment also includes support arms 248 for providing additional strength to the mounting body 206. Alternative embodiments may not include support arms 248 with a non-segmented mounting body 206.

In a preferred embodiment, a user controls the surveillance and attack prevention system 2 using a user interface displayed on a remote computing device 36, 37. Such a user interface includes controls for movement of the motive apparatus 4, for operation of tools and components of the system 2, and for triggering deployment of various components, the controls providing input to the processor via the communications network 38. The remote computing device can be a smart device 36 or a computer 37 connected to the communications network 38. For use with a remote smart device 36, the user interface is preferably comprised of an integrated mobile application. The present invention could utilize a mobile application with customizable features based on the particular system components used at that location. Alternatively, individual mobile applications can be developed specific to the layout and system components at that particular location. In such scenarios, a mobile application can be purchased and then owned by a user, and that mobile application can be developed and customized specifically for that user. In embodiments for use with a remote computer 37 or via a web browser on a smart device 36, the user interface is comprised of a web interface, which can similarly be customized for a particular location.

In most scenarios, the user interface would require pre-authorization for a particular remote computing device 36, 37 and login information including a password for authorized users to begin control of the surveillance and attack prevention system 2. The system 2 would require encryption and security measures to prevent an attacker from taking over the controls of the system 2. Additionally, in most embodiments, the system 2 is configured to allow control by only one remote computing device 36, 37 at a time, however, there may be a particular computing device override established, if desired. The user interface is configured to include input forms and/or buttons for controlling movement of the motive apparatus 4 and movement and deployment of the tools and components of the system 2. The user interface is further configured for displaying live and recorded video and/or audio information at the location. In some embodiments, where the surveillance camera 58 and/or microphones are configured to record for extended periods of time, the system 2 may be configured to send web or mobile application notifications, emails, and/or text messages to one or more particular remote computing devices 36, 37 when certain, pre-set surveillance conditions exist. In other embodiments, the user interface of the present invention only operates when a user opens the interface and logs in. The surveillance and attack prevention system 2 can be configured to receive input from the remote computing device 36, 37 via Bluetooth, other radio frequencies (RF), Wi-Fi, or a wireless intranet.

In another aspect of the present invention, the surveillance and attack prevention system can be further extended via integrated remote alert buttons 40 or fobs connected to the system via the communications network 38, as shown in FIG. 3, and strategically positioned around a building. These buttons may be connected wirelessly or by wired connection. In an attack situation, people can press one of these buttons 40 to notify the system 2 of the location of an attacker or intruder. Such a remote alert button 40 may be particularly valuable in rooms without a motive apparatus 4 present and may be positioned near doorways or anywhere around a room, as desired. In alternative embodiments, the remote alert buttons 40 may be programmed to notify law enforcement of an attack situation. Additionally, remote cameras and/or microphones may also be integrated into the system 2 via connection to the communications network 38 for recording video, still images, and/or audio from an attack scenario. These remote cameras and/or microphones may or may not be positioned in close relation to remote alert buttons 40.

A further embodiment of the present invention includes a transport mechanism for bridging a motive apparatus 4 of the present invention around a doorway or other obstruction. One such transport mechanism includes an elevator-like mechanism located at the end of the T-bar grid or track, near a doorway or other obstruction. The motive apparatus 4 is driven onto the elevator-like mechanism, which mechanism transports the apparatus 4 around the obstruction and onto a metal grid 14 or track on the other side of the obstruction. Alternatively, openings may be cut into the ceiling, with or without covering flaps or trap doors, on either side of an obstruction such as a doorway and a metal track installed allowing the motive apparatus 4 to be driven up and around the obstruction. Instead of using a transport mechanism, multiple motive apparatuses 4 of the present invention may be used in conjunction, with a different motive apparatus 4 in each room, as desired. Switching from controlling of one apparatus 4 to another apparatus 4 in another room can occur either automatically or upon command utilizing a user interface on a remote computing device 36, 37 or remote control 39.

The motive apparatus 4 of the present invention may further be equipped with one or more swivels and/or hitch-like connections to accommodate movement on a magnetic metal track having curves. In such an embodiment, the motive apparatus 4 may further include spring-loaded guides biased towards the metal track to keep the apparatus 4 on line with the track.

In an exemplary embodiment, the surveillance and attack prevention system motive apparatus 4 is placed suspended from a ferrous material T-bar grid 14 of a ceiling of a building near the building entrance. The surveillance and attack prevention system motive apparatus 4 may be permanently suspended from the ceiling, deployed and removed as part of opening and closing procedures, deployed only when certain conditions exist, or deployed and removed in any other manner desired by the user. Moreover, the surveillance and attack prevention system 2 can be configured to record video and audio surveillance at all times, during particular time periods, or only on command by the user. An administrator or security personnel member can open the surveillance and attack prevention system user interface on his or her remote computing device 36, 37. Using the user interface on the remote computing device 36, 37, the user can view video and audio surveillance from the suspended motive apparatus 4. The user can move the motive apparatus 4 along the T-bar grid 14 and adjust system components, as desired, to place the motive apparatus 4 and individual system components in better position to conduct desired surveillance and/or attack prevention functions. If attack conditions exist, the user can control various system components using the user interface to observe, identify, slow, and/or stop an attacker.

In alternative embodiments, the processor of the surveillance and attack prevention system 2 can be programmed with artificial intelligence functionality to automate use of system components in an attack scenario rather than requiring input from a user to a remote computing device 36, 37 or remote control 39.

Moreover, adaptations to the present invention can be made for use in alternative embodiments. One such non-limiting, alternative embodiment includes use of a system of the present invention for cleaning wind turbines. The magnets and an installed metal track, as needed, would allow for a motive apparatus to be suspended from and move along a metal wind turbine, and the system can be configured to mount wind turbine cleaning components controlled by a remote computing device. This could allow a wind turbine to be cleaned while the wind turbine is still in use. Further alternative embodiments of the present invention could include, but are not limited to, adaptations for use in the space program; transport and delivery systems; computer control systems; sterile, hazardous, and/or hostile environments; mining operations; construction; architecture; airports; airplanes; underwater applications; border walls and ports; ships and boats; shipping containers and shipping docks; stadiums and arenas; educational institutions utilizing projector screens in classrooms; and sewer, water, gas, and oil pipe inspection. An advantage of a magnetic, motive apparatus of the present invention for use in metal pipes is that the apparatus can be driven suspended from the top of the pipe rather than being forced to drive through the contents of the pipe on the bottom.

It is to be understood that while certain embodiments and/or aspects of the invention have been shown and described, the invention is not limited thereto and encompasses various other embodiments and aspects.

The invention claimed is:

1. A surveillance and attack prevention system comprising:
    a mounting body mounting a series of magnets, a series of wheels, and a drive motor;
    wherein said magnets are configured for suspending said mounting body from an existing magnetic metal structure and countering gravitational pull via magnetic pull between said magnets and said existing magnetic metal structure;
    said drive motor drivingly connected to said wheels and configured for moving said mounting body along said existing magnetic metal structure;
    a processor connected to said drive motor and to a power source;
    said processor configured for controlling operation of said drive motor;
    said mounting body further mounting surveillance and attack prevention components connected to said processor and configured to observe, identify, and deter an attacker;
    wherein said processor is configured for controlling operation of said surveillance and attack prevention components;
    said mounting body comprising a center section, a front section, and a back section;
    said mounting body center section mounting a central magnet and said drive motor;
    each of said mounting body front and back sections mounting a non-central magnet and a wheel;
    each of said mounting body front and back sections attaching to said mounting body center section at a position near said drive motor via a support arm; and
    said mounting body center section further comprising a rotational mechanism positioned below said central magnet and above said drive motor;
    said rotational mechanism connected to said processor and configured for rotating said mounting body about a central axis.

2. The surveillance and attack prevention system according to claim 1, wherein:
    an uppermost point of each of said wheels is positioned higher than an uppermost point of each of said magnets such that a space is formed between each said magnet and said existing magnetic metal structure.

3. The surveillance and attack prevention system according to claim 1, further comprising:
    an input/output interface connected to said processor; and
    said input/output interface configured for receiving inputs via a communications network for controlling outputs of said surveillance and attack prevention system.

4. The surveillance and attack prevention system according to claim 3, further comprising:

a remote computing device configured for providing inputs to said processor for controlling outputs of said surveillance and attack prevention system; and a user interface on said remote computing device accommodating user entry of inputs for controlling outputs of said surveillance and attack prevention system.

5. The surveillance and attack prevention system according to claim 3, further comprising:

a remote control device configured for providing inputs to said processor for controlling outputs of said surveillance and attack prevention system.

6. The surveillance and attack prevention system according to claim 3, further comprising:

a remote alert button connected to said surveillance and attack prevention system via said communications network; and wherein actuation of said remote alert button provides notification of an alert condition.

7. The surveillance and attack prevention system according to claim 1, wherein:

said surveillance and attack prevention components are selected from the group consisting of: cameras, microphones, speakers, spray nozzles, colored dye sprays, oil-based sprays, stun guns, stun grenades, lasers, lights, smoke grenades, odor grenades, smoke detectors, odor detectors, and combinations thereof.

8. The surveillance and attack prevention system according to claim 1, further comprising:

a database configured for storing surveillance media recorded by said surveillance and attack prevention system.

9. The surveillance and attack prevention system according to claim 1, wherein:

said mounting body further comprises guides configured for guiding said mounting body along said existing magnetic structure.

10. The surveillance and attack prevention system according to claim 1, wherein:

said rotational mechanism comprises a spring-loaded rotary solenoid; and said spring-loaded rotary solenoid is configured for rotating said mounting body front and back sections and a portion of said mounting body center section below said rotational mechanism about said central axis when said spring-loaded rotary solenoid is activated.

11. The surveillance and attack prevention system according to claim 10, further comprising:

a lowering mechanism configured for counteracting magnetic pull and lowering each of said mounting body front and back sections from said existing metal structure prior to said activation of said spring-loaded rotary solenoid.

12. The surveillance and attack prevention system according to claim 11, wherein:

said lowering mechanism is configured for releasing each of said mounting body front and back section for closer magnetic interaction with said existing metal structure after rotation of said rotational mechanism is complete.

13. The surveillance and attack prevention system according to claim 1, whererin:

said mounting body center section further comprises non-magnetic, free-spinning, ball bearing spacers attached to the upper side of said central magnet.

14. The surveillance and attack prevention system according to claim 1, further comprising:

a retractable, protective cover configured for protection of said surveillance and attack prevention system with said surveillance and attack prevention system is not in active use.

15. The surveillance and attack prevention system according to claim 1, further comprising:

a transport mechanism configured for bridging said mounting body around an obstruction between said existing magnetic metal structure and a second existing magnetic metal structure.

16. A surveillance and attack prevention system comprising:

a mounting body made up of a center section, a front section, and a back section;

said mounting body center section mounting a central magnet and a drive motor;

each of said mounting body front and back sections mounting a non-central magnet and a wheel;

each of said mounting body front and back sections attaching to said mounting body center section at a position near said drive motor via a support arm;

wherein said central magnet and non-central magnets are configured for suspending said mounting body from an existing magnetic metal structure and countering gravitational pull via magnetic pull between said central and non-central magnets and said existing magnetic metal structure;

wherein an uppermost point of each of said wheels is positioned higher than an uppermost point of each of said central and non-central magnets such that a space is formed between each said central and non-central magnet and said existing magnetic metal structure;

said drive motor drivingly connected to said wheels and configured for moving said mounting body along said existing magnetic metal structure;

a processor connected to said drive motor and to a power source;

said processor configured for controlling operation of said drive motor;

said mounting body further mounting surveillance and attack prevention components connected to said processor and configured to observe, identify, and deter an attacker;

wherein said surveillance and attack prevention components are selected from the group consisting of: cameras, microphones, speakers, spray nozzles, colored dye sprays, oil-based sprays, stun guns, stun grenades, lasers, lights, smoke grenades, odor grenades, smoke detectors, odor detectors, and combinations thereof;

wherein said processor is configured for controlling operation of said surveillance and attack prevention components;

an input/output interface connected to said processor;

said input/output interface configured for receiving inputs via a communications network for controlling outputs of said surveillance and attack prevention system;

a remote computing device configured for providing inputs to said processor for controlling outputs of said surveillance and attack prevention system;

a user interface on said remote computing device accommodating user entry of inputs for controlling outputs of said surveillance and attack prevention system;

a database configured for storing surveillance media recorded by said surveillance and attack prevention system;

said mounting body further comprising guides configured for guiding said mounting body along said existing magnetic structure;

said mounting body center section further comprising a rotational mechanism positioned below said central magnet and above said drive motor;

said rotational mechanism connected to said processor and comprising a spring-loaded rotary solenoid; and said spring-loaded rotary solenoid is configured for rotating said mounting body front and back sections and a portion of said mounting body center section below said rotational mechanism about a central axis when said spring-loaded rotary solenoid is activated.

17. A method of using a surveillance and attack prevention system having a mounting body mounting a series of magnets, a series of wheels, and a drive motor; the mounting body comprising a center section, a front section, and a back section; the mounting body center section mounting a central magnet and the drive motor; each of the mounting body front and back sections mounting a non-central magnet and a wheel; the drive motor drivingly connected to the wheels; a processor connected to the drive motor and a power source; the mounting body further mounting surveillance and attack prevention components connected to the processor; the mounting body center section further comprising a rotational mechanism positioned below the central magnet and above the drive motor; the rotational mechanism connected to the processor and configured for rotating the mounting body about a central axis; an input/output interface connected to said processor; and a remote computing device having a user interface accommodating user entry of inputs for controlling outputs of said surveillance and attack prevention system, the method comprising the steps of:

suspending said mounting body from an existing magnetic metal structure;

opening said user interface on said remote computing device;

sending inputs from said remote computing device to said processor for controlling outputs of said surveillance and attack prevention system via a communications network;

said processor operating said drive motor in response to said inputs;

said drive motor drivingly moving said wheels, driving said mounting body along said existing magnetic metal structure; and said processor operating said surveillance and attack prevention components in response to said inputs.

18. The method according to claim 17 wherein:

said surveillance and attack prevention components are selected from the group consisting of: cameras, microphones, speakers, spray nozzles, colored dye sprays, oil-based sprays, stun guns, stun grenades, lasers, lights, smoke grenades, odor grenades, smoke detectors, odor detectors, and combinations thereof.

19. The method according to claim 17, further comprising the step of:

the surveillance and attack prevention system observing, identifying, and deterring an attacker.

20. The method according to claim 17, further comprising the steps of:

said processor engaging said rotational mechanism in response to said inputs; and said rotational mechanism rotating said mounting body about said central axis.

* * * * *